Jan. 7, 1936.  L. C. GOSSETT  2,026,887
CULTIVATING IMPLEMENT
Filed Feb. 14, 1935   3 Sheets-Sheet 1

Inventor
Leo Clyde Gossett
By *Clarence A. O'Brien*
Attorney

Jan. 7, 1936.     L. C. GOSSETT     2,026,887
CULTIVATING IMPLEMENT
Filed Feb. 14, 1935     3 Sheets-Sheet 3

Inventor
Leo Clyde Gossett

By Clarence A. O'Brien
Attorney

Patented Jan. 7, 1936

2,026,887

UNITED STATES PATENT OFFICE 2,026,887

CULTIVATING IMPLEMENT

Leo Clyde Gossett, Fairmount, Ind.

Application February 14, 1935, Serial No. 6,586

1 Claim. (Cl. 97—237)

This invention appertains to new and useful improvements in agricultural implements and more particularly to a cultivator for cultivating growing plants.

The principal object of the present invention is to provide an implement for mulching the soil in such a manner as to not harm the roots of growing plants.

Another important object of the invention is to provide a cultivating implement which will pulverize the soil to a limited depth and not interfere with the growth under care.

Other important objects and advantages of the invention will become apparent to the reader of the following specification.

In the drawings:

Figure 5 represents a side elevational view of a hand type.

Figure 1:
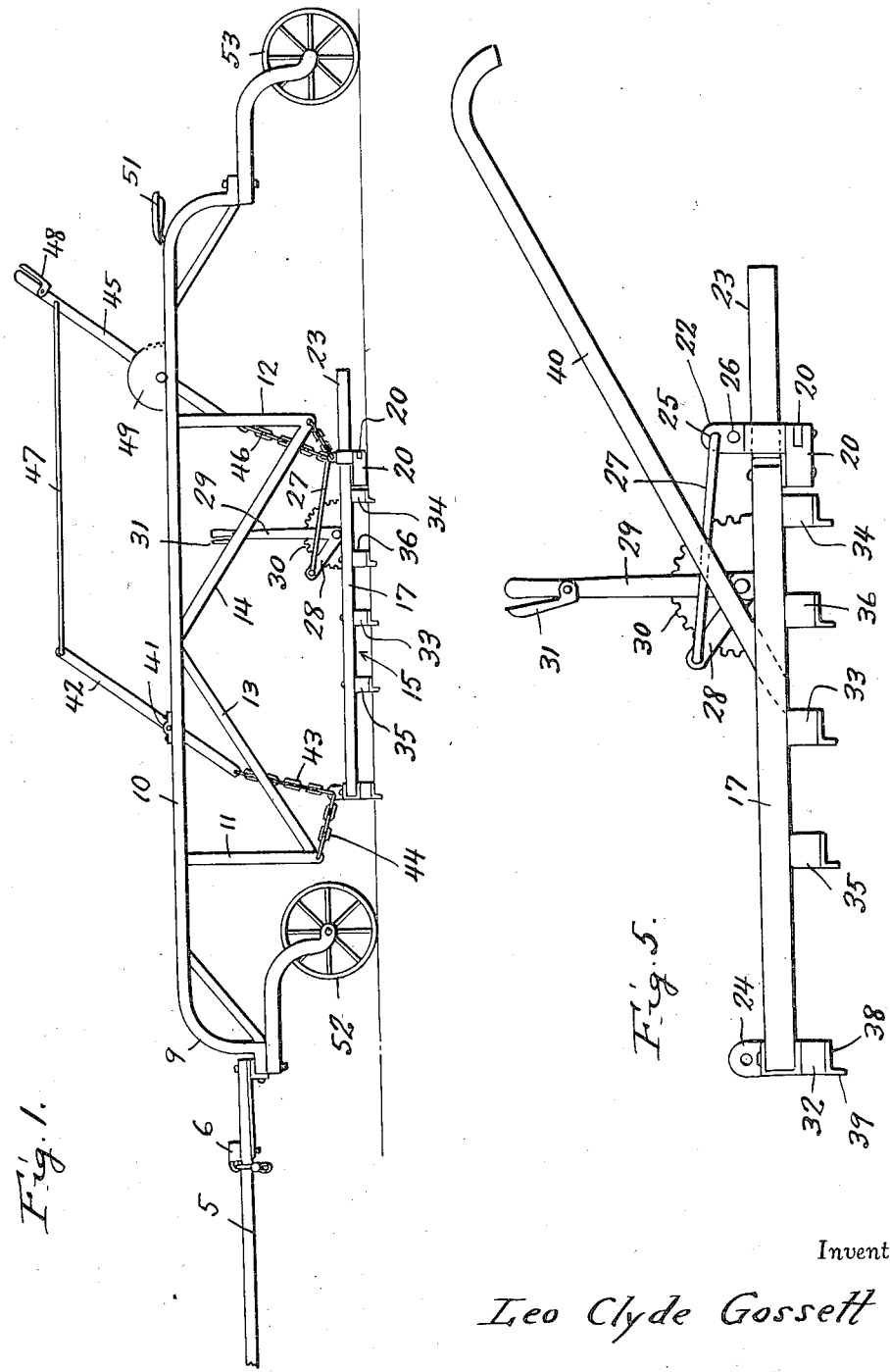
Figure 1 represents a side elevational view of the implement.

Referring to the drawings wherein like numerals designate like parts, it can be seen that the apparatus includes the tongue 5 and the draft means 6. It can be seen in Figures 1 and 2, that the tongue 5 is connected to the cross bar 7 as at 8 and to the ends of this cross bar 7 are pivotally connected the depending end portions 9 of rearwardly extending and parallel bars 10. Each of these bars 10 is provided with a pair of rearwardly spaced depending members 11—12, braced as at 13—14 respectively.

For each of the rearwardly extending bars 10 a mulching assembly such as is generally referred to by numeral 15 is employed. This mulching assembly consists in construction of a front cross member 16 to the ends of which are pivotally connected the front ends of the side bars 17—17, as at 18, while the rear ends of these side bars 17—17 are pivotally connected as at 19 to the outer ends of the link members 20, the inner ends of the links members 20 being pivotally connected to the slide block 21 which is provided with an upstanding lug 22. This slide block 21 is slidably disposed on the beam 23 which extends rearwardly above the cross member 16. The cross member 16 is provided with upwardly extending and perforated lugs 24. The lug 22 is provided with an upper opening 25, a lower opening 26, the rod 27 of the shifting means being engaged to the upper opening 25 at one end thereof while at its opposite end is pivotally connected to the arm 28 carried by the hand lever 29. The hand lever being provided with a rack 30 and detent 31.

Figure 3:
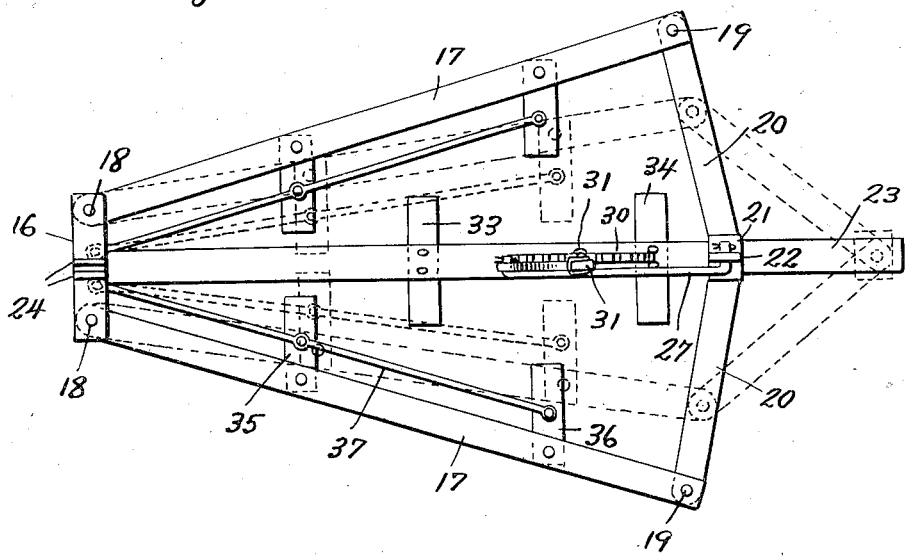
Figure 3 represents a top plan view of one of the mulching assemblies.
Figure 4:
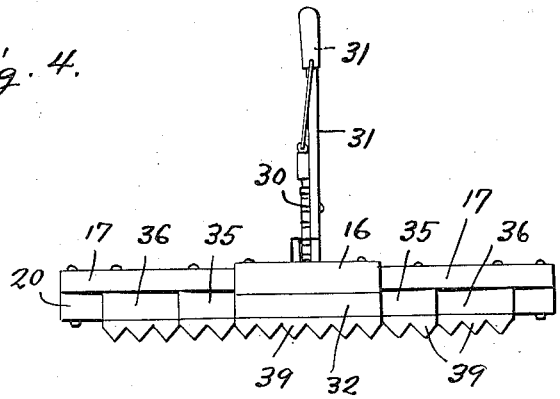
Figure 4 represents a front elevational view of the assembly shown in Figure 3.

As to the assembly in Figure 5 and also Figure 3, the cross member 16 is provided with a block 32 secured to the bottom thereof and a pair of similar blocks 33—34 are secured transversely against the bottom of the beam 23. A pair of such blocks are denoted by the numerals 35—36 and are carried by the bottom side of each of the side bars 17—17 in staggered relation with respect to the blocks 33—34. A rod 37 is provided for each of the side rails 17, this rod having its rear end pivotally connected to the block 36, its intermediate portion pivotally connected to the block 35 and its forward end portion pivotally connected to a cross member 16. Obviously, when the hand lever 29 is actuated the side rails 17—17 can be brought in and the device assumes the position shown in dotted lines in Figure 3, in which position the blocks are in closer relation. The blocks each carry a plate 38 provided with a depending and serrated blade 39, the teeth of which can only cut into the soil a limited depth.

When this mulching assembly is employed for a walking attendant, the rearwardly inclined hand bars 40 are employed and the draft equipment is connected up with the front lug 24.

Figure 2:
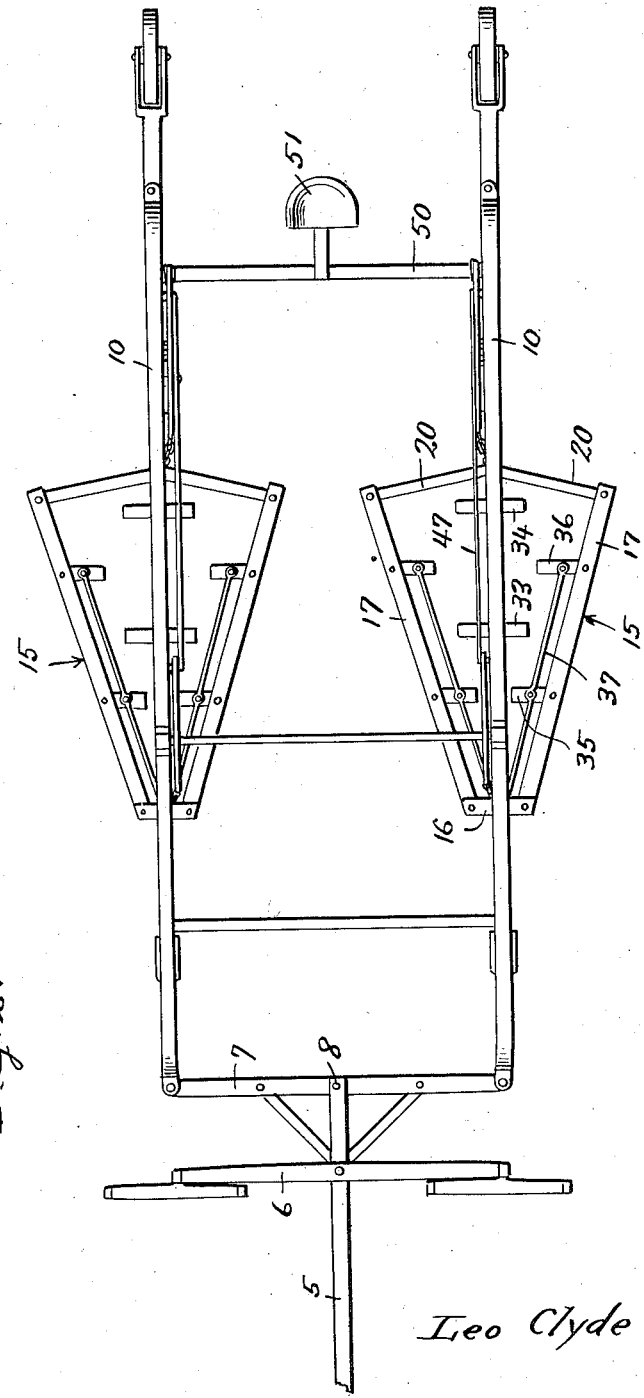
Figure 2 represents a top plan view of the apparatus.

However, when the assembly is used in multiple on the wheeled carriage shown in Figures 1 and 2, a cross shaft 41 is provided and equipped with a pair of rockers 42 and each of the rockers at its lower end being provided with chains 43 which extend downwardly and connect to the lugs 24 of the underlying assembly 15. These lugs 24 are further connected by a chain section 44 to the lower ends of the depending members 11.

The side bars 10 are further provided with rockable hand levers 45, the lower ends of which are provided with chain extensions 46 connected to the rear lugs 22 as shown in Figure 1. The hand levers 45 are each connected with corresponding front rockers 42 by connecting rods 47 and each is provided with a detent 48 cooperative with a rack 49 on the corresponding side bar 10. Obviously by actuating the hand bars 45, the mulching units 15 can be lifted from the soil.

A cross member 50 between the side bars 10—10 adds support to the attendant's seat 51 and as is clearly shown in Figure 1, the side and rear of the bars 10—10 are equipped with a supporting wheel 52—53 respectively.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

A cultivator of the character described comprising a frame, a plurality of ground engaging units on the frame, each of said units consisting of an angular plate serrated at its lower edge to provide ground engaging teeth and secured by its other flange portion to the frame, said units being arranged and secured to the bottom of the frame in staggered relation.

LEO CLYDE GOSSETT.